United States Patent
Robin

(10) Patent No.: US 9,085,721 B2
(45) Date of Patent: Jul. 21, 2015

(54) AZEOTROPIC AND AZEOTROPE-LIKE COMPOSITIONS INVOLVING CERTAIN HALOOLEFINS AND USES THEREOF

(75) Inventor: Mark L Robin, Middletown, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 13/981,095

(22) PCT Filed: Feb. 3, 2012

(86) PCT No.: PCT/US2012/023704
§ 371 (c)(1),
(2), (4) Date: Jul. 23, 2013

(87) PCT Pub. No.: WO2012/106565
PCT Pub. Date: Aug. 9, 2012

(65) Prior Publication Data
US 2013/0292599 A1 Nov. 7, 2013

Related U.S. Application Data

(60) Provisional application No. 61/439,389, filed on Feb. 4, 2011, provisional application No. 61/439,388, filed on Feb. 4, 2011, provisional application No. 61/439,386, filed on Feb. 4, 2011, provisional application No. 61/448,241, filed on Mar. 2, 2011, provisional application No. 61/448,243, filed on Mar. 2, 2011.

(51) Int. Cl.
  *C09K 5/10* (2006.01)
  *C09K 3/30* (2006.01)
  *C09K 3/00* (2006.01)
  *C08J 9/14* (2006.01)
  *C09K 5/04* (2006.01)

(52) U.S. Cl.
  CPC . *C09K 3/00* (2013.01); *C08J 9/146* (2013.01); *C09K 3/30* (2013.01); *C09K 5/045* (2013.01); *C09K 2205/122* (2013.01); *C09K 2205/126* (2013.01); *C09K 2205/22* (2013.01); *C09K 2205/32* (2013.01)

(58) Field of Classification Search
  CPC ...... C09K 5/044; C09K 3/30; C09K 2205/32; C08J 9/144
  USPC ...................................... 252/8, 67, 364, 78.1
  See application file for complete search history.

(56) References Cited

U.S. PATENT DOCUMENTS

| 5,558,810 A | 9/1996 | Minor et al. |
| 5,777,184 A | 7/1998 | Van Der Puy et al. |
| 2008/0269532 A1 | 10/2008 | Swearingen |
| 2010/0076231 A1 | 3/2010 | Nappa et al. |
| 2010/0243943 A1 | 9/2010 | Robin |
| 2011/0001080 A1 | 1/2011 | Van Horn et al. |
| 2011/0144216 A1 | 6/2011 | Hulse et al. |
| 2012/0138847 A1* | 6/2012 | Van Horn et al. ............... 252/68 |

FOREIGN PATENT DOCUMENTS

| WO | 2008/057513 A1 | 5/2008 |
| WO | 2010/141527 A1 | 12/2010 |
| WO | 2011/022260 A1 | 2/2011 |
| WO | 2011/084553 A2 | 7/2011 |

OTHER PUBLICATIONS

PCT International Search Report and Written Opinion mailed Oct. 8, 2012.

(Continued)

*Primary Examiner* — Peter F Godenschwager

(57) ABSTRACT

Azeotropic or azeotrope-like compositions are disclosed. The azeotropic or azeotrope-like compositions are mixtures of (A) a compound of the formula $CF_3CX{=}CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX{=}CHR_a$ is the E configurational isomer, and (iii) when $R_a$ is $CF_3$, the compound of formula $CF_3CX{=}CHR_a$ is the Z configurational isomer; and (B) a compound of the formula $CF_3R_b$ where $R_b$ is $CHFCH_2F$ or $CH{=}CHCF_3$, provided that when $R_b$ is $CH{=}CHCF_3$, X is F and the compound of formula $CF_3R_b$ is the Z configurational isomer. Also disclosed are processes for using such azeotropic or azeotrope-like compositions for preparing a thermoplastic or thermoset foam, for producing refrigeration, for producing an aerosol product and for extinguishing and suppressing a fire; and as blowing agents, solvents, heat transfer media and dielectrics.

15 Claims, 5 Drawing Sheets

(56) References Cited

OTHER PUBLICATIONS

Doherty, M. F. et al., Conceptual Design of Distillation Systems, McGraw-Hill (New York), 2001, pp. 185-186 and 351-359.
Null, Harold R., Phase Equilibrium in Process Design, Wiley-Interscience Publisher, 1970, pp. 124-126.
Reid, Robert C. et al., The Properties of Gases & Liquids, Fourth Edition, published by McGraw Hill, pp. 241-387.
Walas, Stanley M., Phase Equilibria in Chemical Engineering, published by Butterworth Publishers, 1985, pp. 165-244.

* cited by examiner

AZEOTROPIC AND AZEOTROPE-LIKE COMPOSITIONS INVOLVING CERTAIN HALOOLEFINS AND USES THEREOF

This application is a national filing under 35 U.S.C. 371 of International Application No. PCT/US2012/23704 filed Feb. 3, 2012, and claims priority of U.S. Provisional Application No. 61/439,389 filed Feb. 4, 2011.

BACKGROUND OF THE INVENTION

1. Field of the Disclosure

The present disclosure relates to azeotropic or azeotrope-like compositions wherein at least one of the components is a haloolefin.

2. Description of Related Art

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future. Thus, there is a need for compositions that do not contribute to the destruction of stratospheric ozone and also have low global warming potentials (GWPs). Certain hydrofluoroolefins, such as 1,1,1,4,4,5,5,5-octafluoro-2-pentene ($CF_3CH=CHCF_2CF_3$, HFO-1438mzz) and 1,1,1,4,4,4-hexafluoro-2-butene ($CF_3CH=CHCF_3$, FC-1336mzz, HFO-1336mzz), are believed to meet both goals. 1-chloro-3,3,3-trifluoropropene (HCFO-1233zd) and 1-chloro-2,3,3,3-tetrafluoropropene (HCFO-1224yd) are also examples of compounds having low ODP and low GWP.

SUMMARY OF THE INVENTION

This disclosure provides a composition comprising (A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer; wherein the component (B) compound is present in the composition in an amount effective to form an azeotropic or azeotrope-like combination with the component (A) compound in the composition.

In one aspect this disclosure provides a composition consisting essentially of (a) E-HFO-1438mzz and (b) HFC-245eb; wherein the HFC-245eb is present in an effective amount to form an azeotropic or azeotrope-like mixture with E-HFO-1438mzz.

In another aspect this disclosure provides a composition consisting essentially of (a) E-HCFO-1233zd and (b) HFC-245eb; wherein the HFC-245eb is present in an effective amount to form an azeotropic or azeotrope-like mixture with E-HCFO-1233zd.

In another aspect this disclosure provides a composition consisting essentially of (a) E-HCFO-1224yd and (b) HFC-245eb; wherein the HFC-245eb is present in an effective amount to form an azeotropic or azeotrope-like mixture with E-HCFO-1224yd.

In another aspect this disclosure provides a composition consisting essentially of (a) Z-HFO-1336mzz and (b) HFC-245eb; wherein the HFC-245eb is present in an effective amount to form an azeotrope-like mixture with Z-HFO-1336mzz.

In another aspect this disclosure provides a composition consisting essentially of (a) Z-HFO-1336mzz and (b) E-HCFO-1224yd; wherein the E-HCFO-1224yd is present in an effective amount to form an azeotrope-like mixture with Z-HFO-1336mzz.

Also provided are azeotropic or azeotrope-like compositions that consist essentially of (A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer; and a process for preparing a thermoplastic or thermoset foam, a process for producing refrigeration, a process using an azeotropic or azeotrope-like composition as a solvent, a process for producing an aerosol product, a process using an azeotropic or azeotrope-like composition as a heat transfer media, a process for extinguishing or suppressing fire and a process using an azeotropic or azeotrope-like composition as a dielectric, all of which processes use such azeotropic or azeotrope-like compositions consisting essentially of a component (A) compound and a component (B) compound.

DETAILED DESCRIPTION OF THE INVENTION

Figure 1:
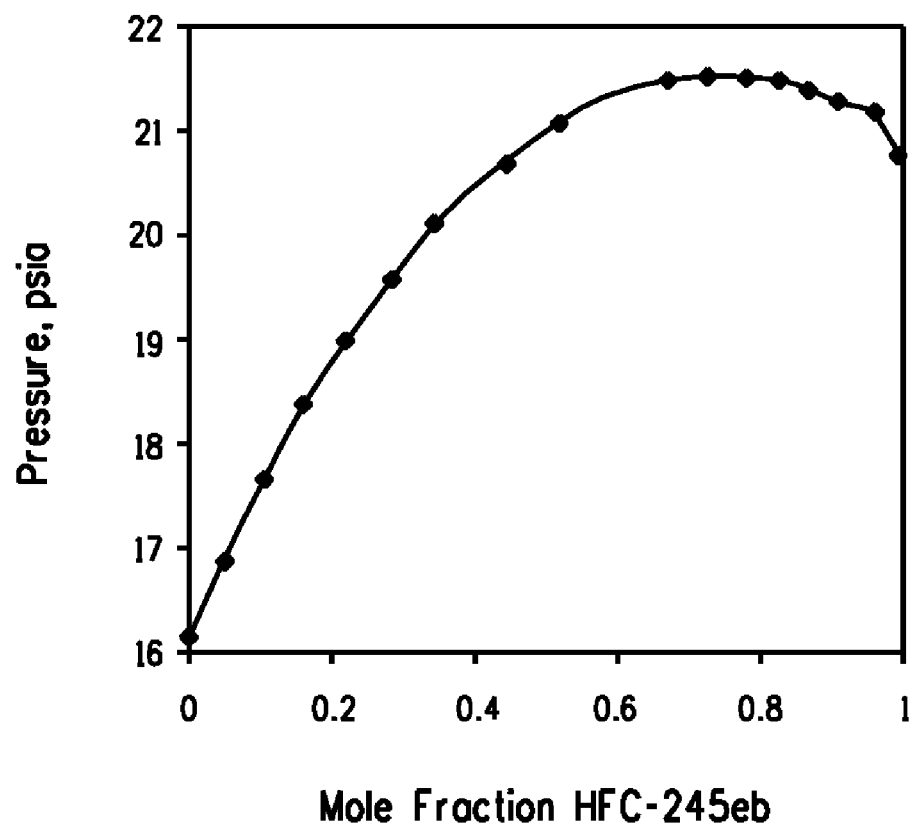
FIG. 1 is a graphical representation of an azeotropic composition of E-HFO-1438mzz and HFC-245eb at a temperature of about 31.8° C.

In many applications, the use of a pure single component or an azeotropic or azeotrope-like mixture is desirable. For example, when a blowing agent composition (also known as foam expansion agents or foam expansion compositions) is not a pure single component or an azeotropic or azeotrope-like mixture, the composition may change during its application in the foam forming process. Such change in composition could detrimentally affect processing or cause poor performance in the application. Also, in refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure single component or an azeotropic or azeotrope-like composition, the refrigerant composition may change when leaked or discharged to the atmosphere from the refrigeration equipment. The change in refrigerant composition may cause the refrigerant to become flammable or to have poor refrigeration performance. Accordingly, there is a need for using azeotropic or azeotrope-like mixtures in these and other applications, for example azeotropic or azeotrope-like mixtures containing E-1,1,1,4,4,5,5,5-octafluoro-2-pentene (trans-1,1,1,4,4,5,5,5-octafluoro-2-pentene, E-$CF_3CH=CHCF_2CF_3$, trans-$CF_3CH=CHCF_2CF_3$, E-HFO-1438mzz, trans-HFO-1438mzz) and 1,1,1,2,3-pentafluoropropane ($CF_3CHFCH_2F$, HFC-245eb); azeotropic or azeotrope-like mixtures containing E-1-chloro-3,3,3-trifluoropropene (E-$CF_3CH=CHCl$, trans-1-chloro-3,3,3-trifluoropropene, E-HCFO-1233zd, trans-HCFO-1233zd) and 1,1,1,2,3-pentafluoropropane ($CF_3CHFCH_2F$, HFC-245eb); azeotropic or azeotrope-like mixtures containing E-1-chloro-2,3,3,3-tetrafluoropropene (E-$CF_3CF=CHCl$, trans-1-chloro-2,3,3,3-tetrafluoropropene, E-HCFO-1224yd, trans-HCFO-1224yd) and 1,1,1,2,3-pentafluoropropane ($CF_3CHFCH_2F$, HFC-245eb); azeotropic or azeotrope-like mixtures containing Z-1,1,1,4,4,4-hexafluoro-2-butene (Z-$CF_3CH=CHCF_3$, Z-HFO-1336mzz, Z-HFO-1336mzz) and 1,1,1,2,3-pentafluoropropane ($CF_3CHFCH_2F$, HFC-245eb); or azeotropic or azeotrope-like mixtures containing Z-1,1,1,4,4,4-hexafluoro-2-butene (Z—$CF_3CH=CHCF_3$, Z-FC-1336mzz, Z-HFO-1336mzz) and E-1-chloro-2,3,3,3-tetrafluoropropene (E-$CF_3CF=CHCl$, E-HCFO-1224yd).

Before addressing details of embodiments described below, some terms are defined or clarified.

HFO-1438mzz may exist as one of two configurational isomers, E or Z; and HFO-1438mzz as used herein refers to the isomers, Z-HFO-1438mzz or E-HFO-1438mzz, as well as any combinations or mixtures of such isomers. HCFO-1233zd may exist as one of two configurational isomers, E or Z; and HCFO-1233zd as used herein refers to the isomers, Z-HCFO-1233zd or E-HCFO-1233zd, as well as any combinations or mixtures of such isomers. HCFO-1224yd may exist as one of two configurational isomers, E or Z; and HCFO-1224yd as used herein refers to the isomers, Z-HCFO-1224yd or E-HCFO-1224yd, as well as any combinations or mixtures of such isomers. HFO-1336mzz may exist as one of two configurational isomers, E or Z; and HFO-1336mzz as used herein refers to the isomers, Z-HFO-1336mzz or E-HFO-1336mzz, as well as any combinations or mixtures of such isomers.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

E-HFO-1438mzz is a known compound, and its preparation method has been disclosed, for example, in Patent Application Publication WO 2008/0575313 A1, hereby incorporated by reference in its entirety.

E-HCFO-1233zd is a known compound, and its preparation method has been disclosed, for example, by Van Der Puy et al. in U.S. Pat. No. 5,777,184, hereby incorporated by reference in its entirety.

E-HCFO-1224yd is a known compound and can be made through the dehydrofluorination of HCFC-235cb ($CF_3CF_2CH_2Cl$). The preparation method has been disclosed, for example, by Rao et al. in US Patent Publication Number US 2010/0051853, hereby incorporated by reference in its entirety. Dehydrofluorinating $CH_2ClCF_2CF_3$(HCFC-235cb) in the presence of a dehydrofluorination catalyst is disclosed, for example, in U.S. Patent Publication No. 2010-0076231.

Z-HFO-1336mzz is a known compound, and can be made by the selective hydrogenation of hexafluoro-2-butyne with a Lindlar catalyst and hydrogen, such as disclosed in U.S. Patent Publication No. 2008-0269532.

Of note are compositions consisting essentially of (A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer; wherein the component (B) compound is present in the composition in an amount effective to form an azeotropic or azeotrope-like combination with the component (A) compound in the composition. By effective amount is meant an amount of component (B) compound, which, when combined with the component (A) compound, results in the formation of an azeotrope or azeotrope-like mixture.

This application includes compositions consisting essentially of (a) E-HFO-1438mzz and (b) HFC-245eb; wherein the HFC-245eb is present in an effective amount to form an azeotropic or azeotrope-like mixture with the E-HFO-1438mzz. By effective amount is meant an amount of HFC-245eb, which, when combined with E-HFO-1438mzz, results in the formation of an azeotropic or azeotrope-like mixture.

This application includes compositions consisting essentially of (a) E-HCFO-1233zd and (b) HFC-245eb; wherein the HFC-245eb is present in an effective amount to form an azeotropic or azeotrope-like mixture with E-HCFO-1233zd. By effective amount is meant an amount of HFC-245eb, which, when combined with E-HCFO-1233zd, results in the formation of an azeotropic or azeotrope-like mixture.

This application includes compositions consisting essentially of (a) E-HCFO-1224yd and (b) HFC-245eb; wherein the HFC-245eb is present in an effective amount to form an azeotropic or azeotrope-like mixture with E-HCFO-1224yd. By effective amount is meant an amount of HFC-245eb, which, when combined with E-HCFO-1224yd, results in the formation of an azeotropic or azeotrope-like mixture.

This application includes compositions consisting essentially of (a) Z-HFO-1336mzz and (b) HFC-245eb; wherein the HFC-245eb is present in an effective amount to form an azeotrope-like mixture with Z-HFO-1336mzz. By effective amount is meant an amount of HFC-245eb, which, when combined with Z-HFO-1336mzz, results in the formation of an azeotrope-like mixture.

This application includes compositions consisting essentially of (a) Z-HFO-1336mzz and (b) E-HCFO-1224yd; wherein the E-HCFO-1224yd is present in an effective amount to form an azeotrope-like mixture with Z-HFO-1336mzz. By effective amount is meant an amount of E-HCFO-1224yd, which, when combined with Z-HFO-1336mzz, results in the formation of an azeotrope-like mixture.

These definitions include the amounts of each component, which amounts may vary depending on the pressure applied to the composition so long as the azeotropic or azeotrope-like compositions continue to exist at the different pressures, but with possible different boiling points. Therefore, effective amount includes the amounts, such as may be expressed in weight or mole percentages, of each component of the compositions of the instant invention which form azeotropic or azeotrope-like compositions at temperatures or pressures other than as described herein.

As recognized in the art, an azeotropic composition is an admixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit dew point pressure and bubble point pressure with virtually no pressure differential. That is to say that the difference in the dew point pressure and bubble point pressure at a given temperature will be a small value. In this invention, compositions with a difference in dew point pressure and bubble point pressure of less than or equal to 5 percent (based upon the bubble point pressure) is considered to be azeotrope-like.

It is recognized in this field that when the relative volatility of a system approaches 1.0, the system is defined as forming an azeotropic or azeotrope-like composition. Relative volatility is the ratio of the volatility of component 1 to the volatility of component 2. The ratio of the mole fraction of a component in vapor to that in liquid is the volatility of the component.

To determine the relative volatility of any two compounds, a method known as the PTx method can be used. The vapor-liquid equilibrium (VLE), and hence relative volatility, can be determined either isothermally or isobarically. The isothermal method requires measurement of the total pressure of mixtures of known composition at constant temperature. In this procedure, the total absolute pressure in a cell of known volume is measured at a constant temperature for various compositions of the two compounds. The isobaric method requires measurement of the temperature of mixtures of known composition at constant pressure. In this procedure, the temperature in a cell of known volume is measured at a constant pressure for various compositions of the two compounds. Use of the PTx Method is described in detail in "Phase Equilibrium in Process Design", Wiley-Interscience Publisher, 1970, written by Harold R. Null, on pages 124 to 126; hereby incorporated by reference.

These measurements can be converted into equilibrium vapor and liquid compositions in the PTx cell by using an activity coefficient equation model, such as the Non-Random, Two-Liquid (NRTL) equation, to represent liquid phase non-idealities. Use of an activity coefficient equation, such as the NRTL equation is described in detail in "The Properties of Gases and Liquids," 4th edition, published by McGraw Hill, written by Reid, Prausnitz and Poling, on pages 241 to 387, and in "Phase Equilibria in Chemical Engineering," published by Butterworth Publishers, 1985, written by Stanley M. Walas, pages 165 to 244. Both aforementioned references are hereby incorporated by reference. Without wishing to be bound by any theory or explanation, it is believed that the NRTL equation, together with the PTx cell data, can sufficiently predict the relative volatilities of the compositions of the present invention (e.g., the E-HFO-1438mzz/HFC-245eb compositions, the E-HCFO-1233zd/HFC-245eb compositions, the E-HCFO-1224yd/HFC-245eb compositions, the Z-HFO-1336mzz/HFC-245eb compositions, or the Z-HFO-1336mzz/E-HCFO-1224yd compositions, as the case may be) and can therefore predict the behavior of these mixtures in multi-stage separation equipment such as distillation columns.

A

It was found through experiments that E-HFO-1438mzz and HFC-245eb form azeotropic compositions.

To determine the relative volatility of this binary pair, the PTx method described above was used. The temperature in a PTx cell of known volume was measured at constant pressure for various binary compositions. These measurements were then reduced to equilibrium vapor and liquid compositions in the cell using the NRTL equation.

The temperatures measured versus the compositions in the PTx cell for E-HFO-1438mzz/HFC-245eb mixture are shown in FIG. 1, which graphically illustrates the formation of an azeotropic composition consisting essentially of E-HFO-1438mzz and HFC-245eb as indicated by a mixture of about 23.8 mole % E-HFO-1438mzz and 76.2 mole % HFC-245eb having the highest pressure (21.7 psia (150 kPa)) over the range of compositions at about 31.8° C. Based upon these findings, it has been calculated that E-HFO-1438mzz and HFC-245eb form azeotropic compositions ranging from about 3.9 mole percent to about 24.1 mole percent E-HFO-1438mzz and from about 96.1 mole percent to about 75.9 mole percent HFC-245eb (which form azeotropic compositions boiling at a temperature of from about −40° C. to about 140° C. and at a pressure of from about 0.59 psia (4.1 kPa) to about 346 psia (2386 kPa)). For example, at 20.0° C. and 13.9 psia (97 kPa) the azeotropic composition consists essentially of 24.1 mole % E-HFO-1438mzz and 75.9 mole % HFC-245eb. For another example, at 21.5° C. and atmospheric pressure (14.7 psia, 101 kPa) the azeotropic composition consists essentially of 24.1 mole % E-HFO-1438mzz and 75.9 mole % HFC-245eb. For another example, at 140.0° C. and 346 psia (2386 kPa) the azeotropic composition consists essentially of 3.9 mole % E-HFO-1438mzz and 96.1 mole % HFC-245eb. Some more embodiments of azeotropic compositions are listed in Table 1.

TABLE 1

Azeotropic compositions

| Azeotropic Temperature (° C.) | Azeotropic Pressure (psia) | E-HFO-1438mzz (mole %) | HFC-245eb (mole %) |
|---|---|---|---|
| −40.0 | 0.59 | 18.2 | 81.8 |
| −30.0 | 1.14 | 20.2 | 79.8 |
| −20.0 | 2.06 | 21.9 | 78.1 |
| −10.0 | 3.54 | 23.0 | 77.0 |
| 0.0 | 5.80 | 23.8 | 76.2 |
| 10.0 | 9.13 | 24.1 | 75.9 |
| 20.0 | 13.9 | 24.1 | 75.9 |
| 30.0 | 20.3 | 23.8 | 76.2 |
| 31.8 | 21.7 | 23.8 | 76.2 |
| 40.0 | 29.0 | 23.3 | 76.7 |
| 50.0 | 40.3 | 22.5 | 77.5 |
| 60.0 | 54.7 | 21.5 | 78.5 |
| 70.0 | 72.7 | 20.2 | 79.8 |
| 80.0 | 94.8 | 18.8 | 81.2 |
| 90.0 | 122 | 17.3 | 82.7 |
| 100.0 | 154 | 15.5 | 84.5 |
| 110.0 | 192 | 13.4 | 86.6 |
| 120.0 | 236 | 11.0 | 89.0 |
| 130.0 | 287 | 8.1 | 91.9 |
| 140.0 | 346 | 3.9 | 96.1 |

Additionally, azeotrope-like compositions containing E-HFO-1438mzz and HFC-245eb may also be formed. According to calculation, azeotrope-like compositions consisting essentially of 1-99 mole % E-HFO-1438mzz and 99-1 mole % HFC-245eb are formed at temperatures ranging from about −40° C. to about 120° C. (i.e., over this temperature range, the difference in dew point pressure and bubble point pressure of the composition at a particular temperature is less than or equal to 5 percent (based upon the bubble point pressure)).

Such azeotrope-like compositions exist around azeotropic compositions. Some embodiments of azeotrope-like compositions are listed in Table 2. Some more embodiments of azeotrope-like compositions are listed in Table 3.

TABLE 2

Azeotrope-like compositions

| Components | T (° C.) | Mole Percentage Range |
|---|---|---|
| E-HFO-1438mzz/HFC-245eb | −40 | 1-53/47-99 and 95-99/1-5 |
| E-HFO-1438mzz/HFC-245eb | −20 | 1-60/40-99 and 92-99/1-8 |
| E-HFO-1438mzz/HFC-245eb | 0 | 1-66/34-99 and 89-99/1-11 |
| E-HFO-1438mzz/HFC-245eb | 40 | 1-99/1-99 |
| E-HFO-1438mzz/HFC-245eb | 80 | 1-99/1-99 |
| E-HFO-1438mzz/HFC-245eb | 120 | 1-99/1-99 |

TABLE 3

Azeotrope-like compositions

| Components | T (° C.) | Mole Percentage Range |
|---|---|---|
| E-HFO-1438mzz/HFC-245eb | −40 | 5-53/47-95 |
| E-HFO-1438mzz/HFC-245eb | −20 | 5-60/40-95 and 95-99/1-5 |
| E-HFO-1438mzz/HFC-245eb | 0 | 5-66/34-95 and 89-95/5-11 |
| E-HFO-1438mzz/HFC-245eb | 40 | 5-95/5-95 |
| E-HFO-1438mzz/HFC-245eb | 80 | 5-95/5-95 |
| E-HFO-1438mzz/HFC-245eb | 120 | 5-95/5-95 |

B

It was found through experiments that E-HCFO-1233zd and HFC-245eb form azeotropic compositions.

To determine the relative volatility of this binary pair, the PTx method described above was used. The temperature in a PTx cell of known volume was measured at constant pressure for various binary compositions. These measurements were then reduced to equilibrium vapor and liquid compositions in the cell using the NRTL equation.

Figure 2:
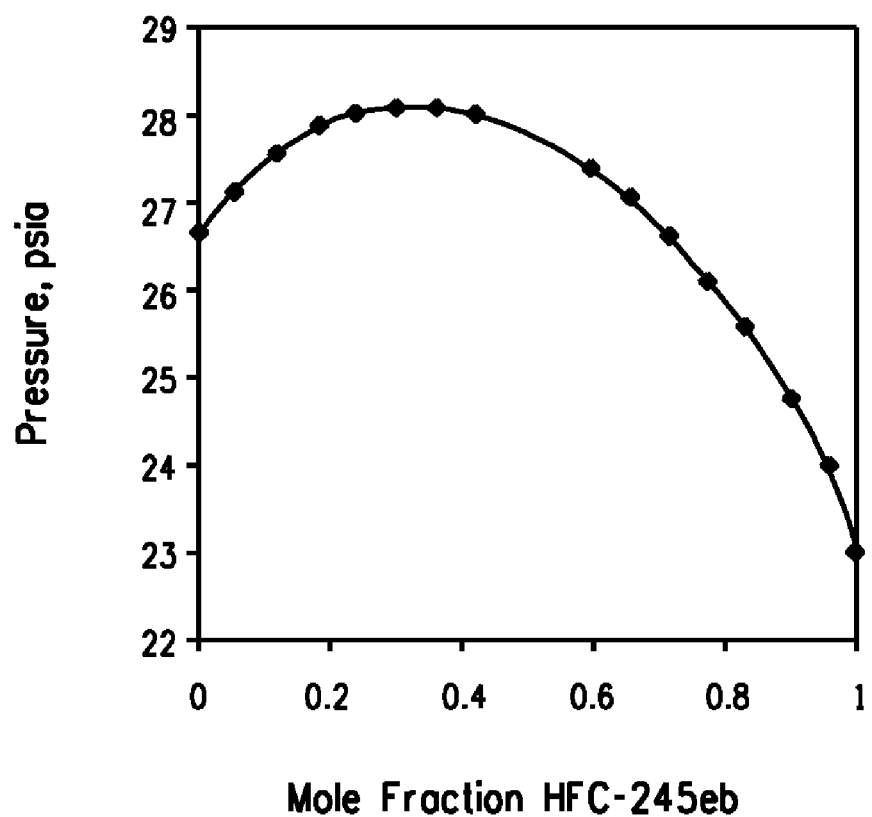
FIG. 2 is a graphical representation of an azeotropic composition of E-HCFO-1233zd and HFC-245eb at a temperature of about 34.6° C.

The temperatures measured versus the compositions in the PTx cell for E-HCFO-1233zd/HFC-245eb mixture are shown in FIG. 2, which graphically illustrates the formation of an azeotropic composition consisting essentially of E-HCFO-1233zd and HFC-245eb as indicated by a mixture of about 63.1 mole % E-HCFO-1233zd and 36.9 mole % HFC-245eb having the highest pressure over the range of compositions at about 34.6° C. Based upon these findings, it has been calculated that E-HCFO-1233zd and HFC-245eb form azeotropic compositions ranging from about 46.8 mole percent to about 74.4 mole percent E-HCFO-1233zd and from about 53.2 mole percent to about 25.6 mole percent HFC-245eb (which form azeotropic compositions boiling at a temperature of from about −40° C. to about 140° C. and at a pressure of from about 0.78 psia (5.38 kPa) to about 384 psia (2648 kPa)). For example, at 20.0° C. and 16.5 psia (114 kPa) the azeotropic composition consists essentially of 67.6 mole % E-HCFO-1233zd and 32.4 mole % HFC-245eb. For another example, at 140.0° C. and 384 psia (2648 kPa) the azeotropic composition consists essentially of 57.3 mole % E-HCFO-1233zd and 42.7 mole % HFC-245eb. For another example, at 16.9° C. and atmospheric pressure (14.7 psia, 101 kPa) the azeotropic composition consists essentially of 68.5 mole % E-HCFO-1233zd and 31.5 mole % HFC-245eb. Some embodiments of azeotropic compositions are listed in Table 4.

TABLE 4

Azeotropic compositions

| Azeotropic Temperature (° C.) | Azeotropic Pressure (psia) | E-HCFO-1233zd (mole %) | HFC-245eb (mole %) |
|---|---|---|---|
| −40.0 | 0.78 | 72.7 | 27.3 |
| −30.0 | 1.49 | 74.1 | 25.9 |
| −20.0 | 2.67 | 74.4 | 25.6 |
| −10.0 | 4.52 | 73.8 | 26.2 |
| 0.0 | 7.26 | 72.3 | 27.7 |
| 10.0 | 11.2 | 70.3 | 29.7 |
| 20.0 | 16.5 | 67.6 | 32.4 |
| 30.0 | 23.7 | 64.6 | 35.4 |
| 34.6 | 27.7 | 63.1 | 36.9 |
| 40.0 | 33.0 | 61.3 | 38.7 |
| 50.0 | 45.0 | 58.0 | 42.0 |
| 60.0 | 60.1 | 54.8 | 45.2 |
| 70.0 | 78.9 | 51.8 | 48.2 |
| 80.0 | 102 | 49.4 | 50.6 |
| 90.0 | 130 | 47.6 | 52.4 |
| 100.0 | 164 | 46.8 | 53.2 |
| 110.0 | 205 | 47.2 | 52.8 |
| 120.0 | 253 | 49.0 | 51.0 |
| 130.0 | 312 | 52.5 | 47.5 |
| 140.0 | 384 | 57.3 | 42.7 |

Additionally, azeotrope-like compositions containing E-HCFO-1233zd and HFC-245eb may also be formed. According to calculation, azeotrope-like compositions consisting essentially of 1-99 mole % E-HCFO-1233zd and 99-1 mole % HFC-245eb are formed at temperatures ranging from about −40° C. to about 140° C. (i.e., over this temperature range, the difference in dew point pressure and bubble point pressure of the composition at a particular temperature is less than or equal to 5 percent (based upon the bubble point pressure)).

Such azeotrope-like compositions exist around azeotropic compositions. Some embodiments of azeotrope-like compositions are listed in Table 5. Some more embodiments of azeotrope-like compositions are listed in Table 6.

TABLE 5

Azeotrope-like compositions

| Components | T (° C.) | Mole Percentage Range |
|---|---|---|
| E-HCFO-1233zd/HFC-245eb | −40 | 1-99/1-99 |
| E-HCFO-1233zd/HFC-245eb | −20 | 1-8/92-99 and 32-99/1-68 |
| E-HCFO-1233zd/HFC-245eb | 0 | 1-99/1-99 |
| E-HCFO-1233zd/HFC-245eb | 40 | 1-99/1-99 |
| E-HCFO-1233zd/HFC-245eb | 80 | 1-99/1-99 |
| E-HCFO-1233zd/HFC-245eb | 120 | 1-99/1-99 |
| E-HCFO-1233zd/HFC-245eb | 140 | 1-99/1-99 |

TABLE 6

Azeotrope-like compositions

| Components | T (° C.) | Mole Percentage Range |
|---|---|---|
| E-HCFO-1233zd/HFC-245eb | −40 | 5-95/5-95 |
| E-HCFO-1233zd/HFC-245eb | −20 | 5-8/92-95 and 32-95/5-68 |
| E-HCFO-1233zd/HFC-245eb | 0 | 5-95/5-95 |
| E-HCFO-1233zd/HFC-245eb | 40 | 5-95/5-95 |
| E-HCFO-1233zd/HFC-245eb | 80 | 5-95/5-95 |
| E-HCFO-1233zd/HFC-245eb | 120 | 5-95/5-95 |
| E-HCFO-1233zd/HFC-245eb | 140 | 5-95/5-95 |

C

It was found through experiments that E-HCFO-1224yd and HFC-245eb form azeotropic compositions.

To determine the relative volatility of this binary pair, the PTx method described above was used. The temperature in a PTx cell of known volume was measured at constant pressure for various binary compositions. These measurements were then reduced to equilibrium vapor and liquid compositions in the cell using the NRTL equation.

Figure 3:
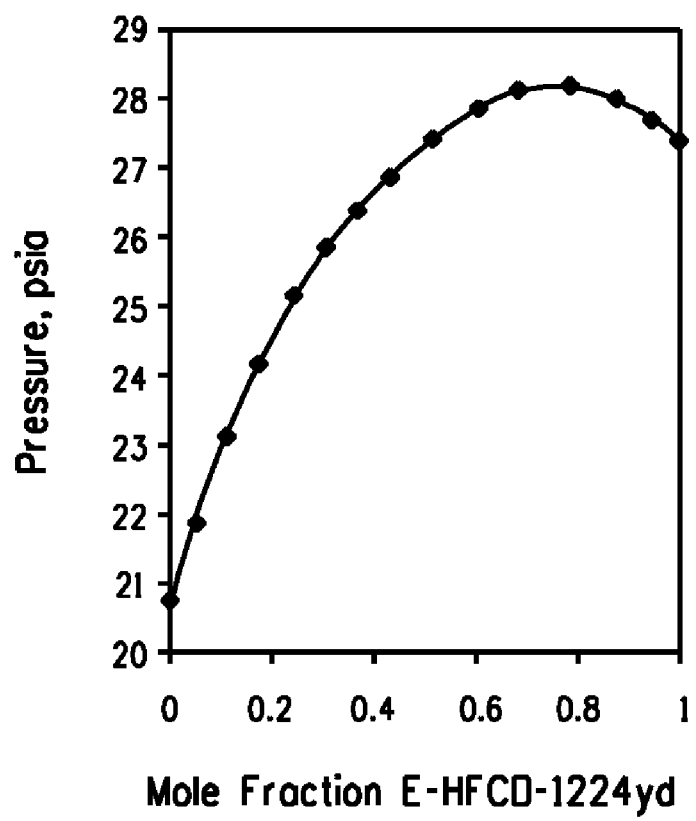
FIG. 3 is a graphical representation of an azeotropic composition of E-HCFO-1224yd and HFC-245eb at a temperature of about 31.7° C.

The temperatures measured versus the compositions in the PTx cell for E-HCFO-1224yd/HFC-245eb mixture are shown in FIG. 3, which graphically illustrates the formation of an azeotropic composition consisting essentially of E-HCFO-1224yd and HFC-245eb as indicated by a mixture of about 78.8 mole % E-HCFO-1224yd and 21.2 mole % HFC-245eb having the highest pressure over the range of compositions at about 31.7° C. Based upon these findings, it has been calculated that E-HCFO-1224yd and HFC-245eb form azeotropic compositions ranging from about 65.6 mole percent to about 86.7 mole percent E-HCFO-1224yd and from about 34.4 mole percent to about 13.3 mole percent HFC-245eb (which form azeotropic compositions boiling at a temperature of from about −40° C. to about 130° C. and at a pressure of from about 0.98 psia (6.76 kPa) to about 333 psia (2296 kPa)). For example, at 20.0° C. and 18.8 psia (130 kPa) the azeotropic composition consists essentially of 81.4 mole % E-HCFO-1224yd and 18.6 mole % HFC-245eb. For another example, at 13.4° C. and atmospheric pressure (14.7 psia, 101 kPa) the azeotropic composition consists essentially of 82.7 mole % E-HCFO-1224yd and 17.3 mole % HFC-245eb. Some embodiments of azeotropic compositions are listed in Table 7.

TABLE 7

Azeotropic Compositions

| Azeotropic Temperature (° C.) | Azeotropic Pressure (psia) | E-HCFO-1224yd (mole %) | HFC-245eb (mole %) |
|---|---|---|---|
| −40.0 | 0.98 | 86.1 | 13.9 |
| −30.0 | 1.84 | 86.7 | 13.3 |
| −20.0 | 3.23 | 86.7 | 13.3 |
| −10.0 | 5.37 | 86.1 | 13.9 |
| 0.0 | 8.48 | 84.9 | 15.1 |
| 10.0 | 12.9 | 83.4 | 16.6 |
| 20.0 | 18.8 | 81.4 | 18.6 |
| 30.0 | 26.8 | 79.2 | 20.8 |
| 31.7 | 28.4 | 78.8 | 21.2 |
| 40.0 | 37.0 | 76.8 | 23.2 |
| 50.0 | 50.1 | 74.4 | 25.6 |
| 60.0 | 66.5 | 72.0 | 28.0 |
| 70.0 | 86.7 | 69.8 | 30.2 |
| 80.0 | 111 | 68.0 | 32.0 |

TABLE 7-continued

Azeotropic Compositions

| Azeotropic Temperature (° C.) | Azeotropic Pressure (psia) | E-HCFO-1224yd (mole %) | HFC-245eb (mole %) |
|---|---|---|---|
| 90.0 | 141 | 66.6 | 33.4 |
| 100.0 | 177 | 65.8 | 34.2 |
| 110.0 | 220 | 65.6 | 34.4 |
| 120.0 | 272 | 66.0 | 34.0 |
| 130.0 | 333 | 67.0 | 33.0 |

Additionally, azeotrope-like compositions containing E-HCFO-1224yd and HFC-245eb may also be formed. According to calculation, azeotrope-like compositions consisting essentially of 1-99 mole % E-HCFO-1224yd and 99-1 mole % HFC-245eb are formed at temperatures ranging from about −40° C. to about 120° C. (i.e., over this temperature range, the difference in dew point pressure and bubble point pressure of the composition at a particular temperature is less than or equal to 5 percent (based upon the bubble point pressure)).

Such azeotrope-like compositions exist around azeotropic compositions. Some embodiments of azeotrope-like compositions are listed in Table 8. Some more embodiments of azeotrope-like compositions are listed in Table 9.

TABLE 8

Azeotrope-like Compositions

| Components | T (° C.) | Mole Percentage Range |
|---|---|---|
| E-HCFO-1224yd/HFC-245eb | −40 | 58-99/1-42 |
| E-HCFO-1224yd/HFC-245eb | −20 | 55-99/1-45 |
| E-HCFO-1224yd/HFC-245eb | 0 | 49-99/1-51 |
| E-HCFO-1224yd/HFC-245eb | 40 | 1-99/1-99 |
| E-HCFO-1224yd/HFC-245eb | 80 | 1-99/1-99 |
| E-HCFO-1224yd/HFC-245eb | 120 | 1-99/1-99 |

TABLE 9

Azeotrope-like compositions

| Components | T (° C.) | Mole Percentage Range |
|---|---|---|
| E-HCFO-1224yd/HFC-245eb | −40 | 58-95/5-42 |
| E-HCFO-1224yd/HFC-245eb | −20 | 55-95/5-45 |
| E-HCFO-1224yd/HFC-245eb | 0 | 49-95/5-51 |
| E-HCFO-1224yd/HFC-245eb | 40 | 5-95/5-95 |
| E-HCFO-1224yd/HFC-245eb | 80 | 5-95/5-95 |
| E-HCFO-1224yd/HFC-245eb | 120 | 5-95/5-95 |

D

It was found through experiments that Z-HFO-1336mzz and HFC-245eb form azeotrope-like compositions.

To determine the relative volatility of this binary pair, the PTx method described above was used. The pressure in a PTx cell of known volume was measured at constant temperature for various binary compositions. These measurements were then reduced to equilibrium vapor and liquid compositions in the cell using the NRTL equation.

Figure 4:
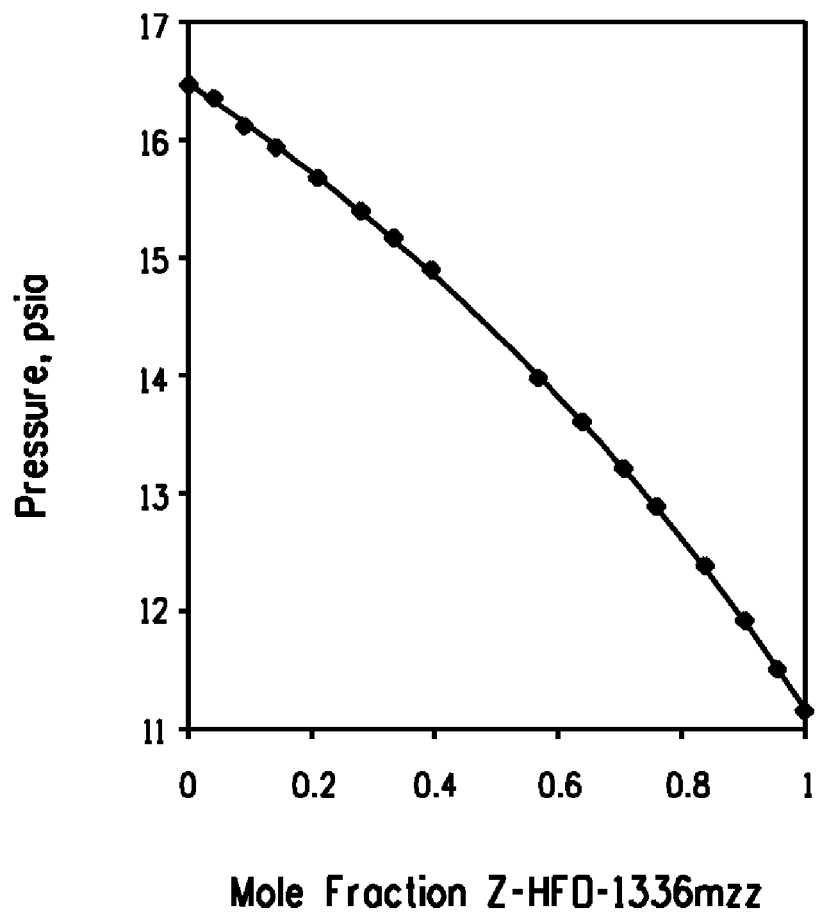
FIG. 4 is a graphical representation of azeotrope-like compositions of Z-HFO-1336mzz and HFC-245eb at a temperature of about 25.8° C.

The pressures measured versus the compositions in the PTx cell for Z-HFO-1336mzz/HFC-245eb mixture are shown in FIG. 4, which graphically illustrates the formation of azeotrope-like compositions consisting essentially of 1-99 mole % Z-HFO-1336mzz and 99-1 mole % HFC-245eb at 25.8° C. According to calculation, azeotrope-like compositions consisting essentially of 1-99 mole % Z-HFO-1336mzz and 99-1 mole % HFC-245eb are formed at temperatures ranging from about −40° C. to about 140° C. (i.e., over this temperature range, the difference in dew point pressure and bubble point pressure of the composition at a particular temperature is less than or equal to 5 percent (based upon the bubble point pressure)).

Some embodiments of azeotrope-like compositions are listed in Table 10. Some more embodiments of azeotrope-like compositions are listed in Table 11.

TABLE 10

Azeotrope-like compositions

| Components | T (° C.) | Mole Percentage Range |
|---|---|---|
| Z-HFO-1336mzz/HFC-245eb | −40 | 1-40/99-60 and 85-99/15-1 |
| Z-HFO-1336mzz/HFC-245eb | −20 | 1-47/99-53 and 79-99/21-1 |
| Z-HFO-1336mzz/HFC-245eb | 0 | 1-55/99-45 and 71-99/29-1 |
| Z-HFO-1336mzz/HFC-245eb | 20 | 1-99/99-1 |
| Z-HFO-1336mzz/HFC-245eb | 40 | 1-99/99-1 |
| Z-HFO-1336mzz/HFC-245eb | 60 | 1-99/99-1 |
| Z-HFO-1336mzz/HFC-245eb | 80 | 1-99/99-1 |
| Z-HFO-1336mzz/HFC-245eb | 100 | 1-99/99-1 |
| Z-HFO-1336mzz/HFC-245eb | 120 | 1-99/99-1 |
| Z-HFO-1336mzz/HFC-245eb | 140 | 1-99/99-1 |

TABLE 11

Azeotrope-like compositions

| Components | T (° C.) | Mole Percentage Range |
|---|---|---|
| Z-HFO-1336mzz/HFC-245eb | −40 | 5-40/95-60 and 85-95/15-5 |
| Z-HFO-1336mzz/HFC-245eb | −20 | 5-47/95-53 and 79-95/21-5 |
| Z-HFO-1336mzz/HFC-245eb | 0 | 5-55/95-45 and 71-95/29-5 |
| Z-HFO-1336mzz/HFC-245eb | 20 | 5-95/95-5 |
| Z-HFO-1336mzz/HFC-245eb | 40 | 5-95/95-5 |
| Z-HFO-1336mzz/HFC-245eb | 60 | 5-95/95-5 |
| Z-HFO-1336mzz/HFC-245eb | 80 | 5-95/95-5 |
| Z-HFO-1336mzz/HFC-245eb | 100 | 5-95/95-5 |
| Z-HFO-1336mzz/HFC-245eb | 120 | 5-95/95-5 |
| Z-HFO-1336mzz/HFC-245eb | 140 | 5-95/95-5 |

E

It was found It was found through experiments that Z-HFO-1336mzz and E-HCFO-1224yd form azeotrope-like compositions.

To determine the relative volatility of this binary pair, the PTx method described above was used. The pressure in a PTx cell of known volume was measured at constant temperature for various binary compositions. These measurements were then reduced to equilibrium vapor and liquid compositions in the cell using the NRTL equation.

Figure 5:
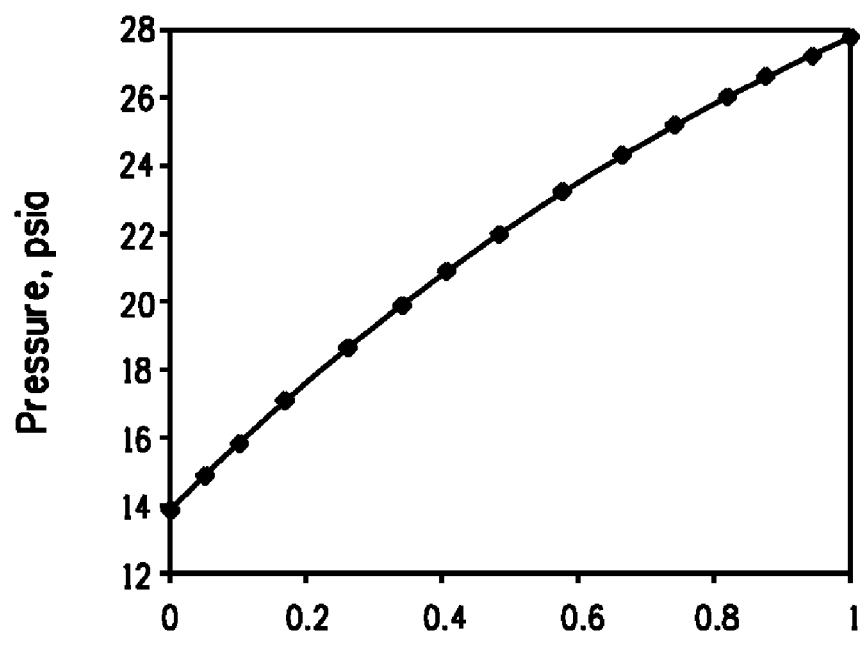
FIG. 5 is a graphical representation of azeotrope-like compositions of Z-HFO-1336mzz and E-HCFO-1224yd at a temperature of about 31.8° C.

The pressures measured versus the compositions in the PTx cell for Z-HFO-1336mzz/E-HCFO-1224yd mixture are shown in FIG. 5, which graphically illustrates the formation of azeotrope-like compositions of Z-HFO-1336mzz and E-HCFO-1224yd at 31.8° C., as indicated by mixtures of about 1 to 22 mole % Z-HFO-1336mzz and about 99 to 78 mole % E-HCFO-1224yd, and mixtures of about 93 to 99 mole % Z-HFO-1336mzz and about 7 to 1 mole % E-HCFO-1224yd. According to calculation, azeotrope-like compositions consisting essentially of 1-99 mole % Z-HFO-1336mzz and 99-1 mole % E-HCFO-1224yd are formed at temperatures ranging from about −40° C. to about 140° C. (i.e., over this temperature range, the difference in dew point pressure and bubble point pressure of the composition at a particular temperature is less than or equal to 5 percent (based upon the bubble point pressure)).

Some embodiments of azeotrope-like compositions are listed in Table 12. Some more embodiments of azeotrope-like compositions are listed in Table 13.

TABLE 12

Azeotrope-like compositions

| Components | T (° C.) | Mole Percentage Range |
|---|---|---|
| Z-HFO-1336mzz/E-HCFO-1224yd | −40 | 1-12/99-88 and 97-99/3-1 |
| Z-HFO-1336mzz/E-HCFO-1224yd | −20 | 1-14/99-86 and 97-99/3-1 |
| Z-HFO-1336mzz/E-HCFO-1224yd | 0 | 1-16/99-84 and 96-99/4-1 |
| Z-HFO-1336mzz/E-HCFO-1224yd | 20 | 1-20/99-80 and 94-99/6-1 |
| Z-HFO-1336mzz/E-HCFO-1224yd | 40 | 1-24/99-76 and 92-99/8-1 |
| Z-HFO-1336mzz/E-HCFO-1224yd | 60 | 1-30/99-70 and 89-99/11-1 |
| Z-HFO-1336mzz/E-HCFO-1224yd | 80 | 1-38/99-62 and 85-99/15-1 |
| Z-HFO-1336mzz/E-HCFO-1224yd | 100 | 1-47/99-53 and 78-99/22-1 |
| Z-HFO-1336mzz/E-HCFO-1224yd | 120 | 1-99/99-1 |
| Z-HFO-1336mzz/E-HCFO-1224yd | 140 | 1-99/99-1 |

TABLE 13

Azeotrope-like compositions

| Components | T (° C.) | Mole Percentage Range |
|---|---|---|
| Z-HFO-1336mzz/E-HCFO-1224yd | −40 | 5-12/95-88 |
| Z-HFO-1336mzz/E-HCFO-1224yd | −20 | 5-14/95-86 |
| Z-HFO-1336mzz/E-HCFO-1224yd | 0 | 5-16/95-84 |
| Z-HFO-1336mzz/E-HCFO-1224yd | 20 | 5-20/95-80 and 94-95/6-5 |
| Z-HFO-1336mzz/E-HCFO-1224yd | 40 | 5-24/95-76 and 92-95/8-5 |
| Z-HFO-1336mzz/E-HCFO-1224yd | 60 | 5-30/95-70 and 89-95/11-5 |
| Z-HFO-1336mzz/E-HCFO-1224yd | 80 | 5-38/95-62 and 85-95/15-5 |
| Z-HFO-1336mzz/E-HCFO-1224yd | 100 | 5-47/95-53 and 78-95/22-5 |
| Z-HFO-1336mzz/E-HCFO-1224yd | 120 | 5-95/95-5 |
| Z-HFO-1336mzz/E-HCFO-1224yd | 140 | 5-95/95-5 |

The azeotropic or azeotrope-like compositions of the present invention can be prepared by any convenient method including mixing or combining the desired amounts. In one embodiment of this invention, an azeotropic or azeotrope-like composition can be prepared by weighing the desired component amounts and thereafter combining them in an appropriate container.

The azeotropic or azeotrope-like compositions of the present invention can be used in a wide range of applications, including their use as aerosol propellants, refrigerants, solvents, cleaning agents, blowing agents (foam expansion agents) for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. Azeotropic or azeotrope-like compositions are provided in accordance with this invention that consist essentially of (A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer. Of note are uses of these azeotropic or azeotrope-like compositions in such applications. Of note are such compositions which consist essentially of E-HFO-1438mzz and HFC-245eb, consist essentially of E-HCFO-1233zd and HFC-245eb, consist essentially of E-HCFO-1224yd and HFC-245eb, consist essentially of Z-HFO-1336mzz and HFC-245eb or consist essentially of Z-HFO-1336mzz and E-HCFO-1224yd.

One embodiment of this invention provides a process for preparing a thermoplastic or thermoset foam. The process comprises using an azeotropic or azeotrope-like composition as a blowing agent, wherein said azeotropic or azeotrope-like composition consists essentially of ((A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer.

Another embodiment of this invention provides a process for producing refrigeration. The process comprises condensing an azeotropic or azeotrope-like composition and thereafter evaporating said azeotropic or azeotrope-like composition in the vicinity of the body to be cooled, wherein said azeotropic or azeotrope-like composition consists essentially of (A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer.

Another embodiment of this invention provides a process using an azeotropic or azeotrope-like composition as a solvent, wherein said azeotropic or azeotrope-like composition consists essentially (A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer.

Another embodiment of this invention provides a process for producing an aerosol product. The process comprises using an azeotropic or azeotrope-like composition as a propellant, wherein said azeotropic or azeotrope-like composition consists essentially of (A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer.

Another embodiment of this invention provides a process using an azeotropic or azeotrope-like composition as a heat transfer media, wherein said azeotropic or azeotrope-like composition consists essentially of (A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer.

Another embodiment of this invention provides a process for extinguishing or suppressing a fire. The process comprises using an azeotropic or azeotrope-like composition as a fire extinguishing or suppression agent, wherein said azeotropic or azeotrope-like composition consists essentially of (A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer.

Another embodiment of this invention provides a process using an azeotropic or azeotrope-like composition as dielectrics, wherein said azeotropic or azeotrope-like composition consists essentially of (A) a compound of the formula $CF_3CX=CHR_a$ where X is H or F and $R_a$ is $CF_3CF_2$, $CF_3$ or Cl, provided that (i) when X is F, $R_a$ is Cl, (ii) when $R_a$ is $CF_3CF_2$ or Cl, the compound of formula $CF_3CX=CHR_a$ is the E configurational isomer, and (iii) when $R_a$ is $CF_3$, the compound of formula $CF_3CX=CHR_a$ is the Z configurational isomer; and (B) a compound of the formula $CF_3R_b$ where $R_b$ is $CHFCH_2F$ or $CH=CHCF_3$, provided that when $R_b$ is $CH=CHCF_3$, X is F and the compound of formula $CF_3R_b$ is the Z configurational isomer.

Of note are embodiments of the above process for preparing a thermoplastic or thermoset foam, process for producing refrigeration, process using an azeotropic or azeotrope-like composition as a solvent, process for producing an aerosol product, process using an azeotropic or azeotrope-like composition as a heat transfer media, process for extinguishing or suppressing fire and process using an azeotropic or azeotrope-like composition as a dielectric, wherein the azeotropic or azeotrope-like composition consists essentially of E-HFO-1438mzz and HFC-245eb, consists essentially of E-HCFO-1233zd and HFC-245eb, consists essentially of E-HCFO-1224yd and HFC-245eb, consists essentially of Z-HFO-1336mzz and HFC-245eb or consists essentially of Z-HFO-1336mzz and E-HCFO-1224yd.

Selected Embodiments

Embodiment A1

A composition consisting essentially of:
(a) E-1,1,1,4,4,5,5,5-octafluoro-2-pentene; and
(b) 1,1,1,2,3-pentafluoropropane; wherein the 1,1,1,2,3-pentafluoropropane is present in an effective amount to form an azeotropic combination with the E-1,1,1,4,4,5,5,5-octafluoro-2-pentene.

Embodiment A2

A composition consisting essentially of:
(a) E-1,1,1,4,4,5,5,5-octafluoro-2-pentene; and
(b) 1,1,1,2,3-pentafluoropropane; wherein the 1,1,1,2,3-pentafluoropropane is present in an effective amount to form an azeotrope-like combination with the E-1,1,1,4,4,5,5,5-octafluoro-2-pentene.

Embodiments A3

A process for preparing a thermoplastic or thermoset foam comprising using an azeotropic or azeotrope-like composition as a blowing agent, wherein said azeotropic or azeotrope-like composition consists essentially of E-1,1,1,4,4,5,5,5-octafluoro-2-pentene and 1,1,1,2,3-pentafluoropropane.

Embodiment A4

A process for producing refrigeration comprising condensing an azeotropic or azeotrope-like composition and thereafter evaporating said azeotropic or azeotrope-like composition in the vicinity of the body to be cooled, wherein said azeotropic or azeotrope-like composition consists essentially of E-1,1,1,4,4,5,5,5-octafluoro-2-pentene and 1,1,1,2,3-pentafluoropropane.

Embodiment A5

A process comprising using an azeotropic or azeotrope-like composition as a solvent, wherein said azeotropic or azeotrope-like composition consists essentially of E-1,1,1,4,4,5,5,5-octafluoro-2-pentene and 1,1,1,2,3-pentafluoropropane.

Embodiment A6

A process for producing an aerosol product comprising using an azeotropic or azeotrope-like composition as a propellant, wherein said azeotropic or azeotrope-like composition consists essentially of E-1,1,1,4,4,5,5,5-octafluoro-2-pentene and 1,1,1,2,3-pentafluoropropane.

Embodiment A7

A process comprising using an azeotropic or azeotrope-like composition as a heat transfer media, wherein said azeotropic or azeotrope-like composition consists essentially of E-1,1,1,4,4,5,5,5-octafluoro-2-pentene and 1,1,1,2,3-pentafluoropropane.

Embodiment A8

A process for extinguishing or suppressing a fire comprising using an azeotropic or azeotrope-like composition as a fire extinguishing or suppression agent, wherein said azeotropic or azeotrope-like composition consists essentially of E-1,1,1,4,4,5,5,5-octafluoro-2-pentene and 1,1,1,2,3-pentafluoropropane.

Embodiment A9

A process comprising using an azeotropic or azeotrope-like composition as dielectrics, wherein said azeotropic or azeotrope-like composition consists essentially of E-1,1,1,4,4,5,5,5-octafluoro-2-pentene and 1,1,1,2,3-pentafluoropropane.

Embodiment B1

A composition consisting essentially of:
(a) E-1-chloro-3,3,3-trifluoropropene; and
(b) 1,1,1,2,3-pentafluoropropane; wherein the 1,1,1,2,3-pentafluoropropane is present in an effective amount to form an azeotropic combination with the E-1-chloro-3,3,3-trifluoropropene.

Embodiment B2

A composition consisting essentially of:
(a) E-1-chloro-3,3,3-trifluoropropene; and
(b) 1,1,1,2,3-pentafluoropropane; wherein the 1,1,1,2,3-pentafluoropropane is present in an effective amount to form an azeotrope-like combination with the E-1-chloro-3,3,3-trifluoropropene.

Embodiment B3

A process for preparing a thermoplastic or thermoset foam comprising using an azeotropic or azeotrope-like composition as a blowing agent, wherein said azeotropic or azeotrope-like composition consists essentially of E-1-chloro-3,3,3-trifluoropropene and 1,1,1,2,3-pentafluoropropane.

Embodiment B4

A process for producing refrigeration comprising condensing an azeotropic or azeotrope-like composition and thereafter evaporating said azeotropic or azeotrope-like composition in the vicinity of the body to be cooled, wherein said azeotropic or azeotrope-like composition consists essentially of E-1-chloro-3,3,3-trifluoropropene and 1,1,1,2,3-pentafluoropropane.

Embodiment B5

A process comprising using an azeotropic or azeotrope-like composition as a solvent, wherein said azeotropic or azeotrope-like composition consists essentially of E-1-chloro-3,3,3-trifluoropropene and 1,1,1,2,3-pentafluoropropane.

Embodiment B6

A process for producing an aerosol product comprising using an azeotropic or azeotrope-like composition as a propellant, wherein said azeotropic or azeotrope-like composition consists essentially of E-1-chloro-3,3,3-trifluoropropene and 1,1,1,2,3-pentafluoropropane.

Embodiment B7

A process comprising using an azeotropic or azeotrope-like composition as a heat transfer media, wherein said azeotropic or azeotrope-like composition consists essentially of E-1-chloro-3,3,3-trifluoropropene and 1,1,1,2,3-pentafluoropropane.

Embodiment B8

A process for extinguishing or suppressing a fire comprising using an azeotropic or azeotrope-like composition as a fire extinguishing or suppression agent, wherein said azeotropic or azeotrope-like composition consists essentially of E-1-chloro-3,3,3-trifluoropropene and 1,1,1,2,3-pentafluoropropane.

Embodiment B9

A process comprising using an azeotropic or azeotrope-like composition as dielectrics, wherein said azeotropic or azeotrope-like composition consists essentially of E-1-chloro-3,3,3-trifluoropropene and 1,1,1,2,3-pentafluoropropane.

Embodiment C1

A composition consisting essentially of:
(a) E-1-chloro-2,3,3,3-tetrafluoropropene; and
(b) 1,1,1,2,3-pentafluoropropane; wherein the 1,1,1,2,3-pentafluoropropane is present in an effective amount to form an azeotropic combination with the E-1-chloro-2,3,3,3-tetrafluoropropene.

Embodiment C2

A composition consisting essentially of:
(a) E-1-chloro-2,3,3,3-tetrafluoropropene; and
(b) 1,1,1,2,3-pentafluoropropane; wherein the 1,1,1,2,3-pentafluoropropane is present in an effective amount to form an azeotrope-like combination with the E-1-chloro-2,3,3,3-tetrafluoropropene.

Embodiment C3

A process for preparing a thermoplastic or thermoset foam comprising using an azeotropic or azeotrope-like composition as a blowing agent, wherein said azeotropic or azeotrope-like composition consists essentially of E-1-chloro-2,3,3,3-tetrafluoropropene and 1,1,1,2,3-pentafluoropropane.

Embodiment C4

A process for producing refrigeration comprising condensing an azeotropic or azeotrope-like composition and thereafter evaporating said azeotropic or azeotrope-like composition in the vicinity of the body to be cooled, wherein said azeotropic or azeotrope-like composition consists essentially of E-1-chloro-2,3,3,3-tetrafluoropropene and 1,1,1,2,3-pentafluoropropane.

Embodiment C5

A process comprising using an azeotropic or azeotrope-like composition as a solvent, wherein said azeotropic or azeotrope-like composition consists essentially of E-1-chloro-2,3,3,3-tetrafluoropropene and 1,1,1,2,3-pentafluoropropane.

Embodiment C6

A process for producing an aerosol product comprising using an azeotropic or azeotrope-like composition as a propellant, wherein said azeotropic or azeotrope-like composition consists essentially of E-1-chloro-2,3,3,3-tetrafluoropropene and 1,1,1,2,3-pentafluoropropane.

Embodiment C7

A process comprising using an azeotropic or azeotrope-like composition as a heat transfer media, wherein said azeotropic or azeotrope-like composition consists essentially of E-1-chloro-2,3,3,3-tetrafluoropropene and 1,1,1,2,3-pentafluoropropane.

Embodiment C8

A process for extinguishing or suppressing a fire comprising using an azeotropic or azeotrope-like composition as a fire extinguishing or suppression agent, wherein said azeotropic or azeotrope-like composition consists essentially of E-1-chloro-2,3,3,3-tetrafluoropropene and 1,1,1,2,3-pentafluoropropane.

Embodiment C9

A process comprising using an azeotropic or azeotrope-like composition as dielectrics, wherein said azeotropic or azeotrope-like composition consists essentially of E-1-chloro-2,3,3,3-tetrafluoropropene and 1,1,1,2,3-pentafluoropropane.

Embodiment D1

A composition consisting essentially of:
(a) Z-1,1,1,4,4,4-hexafluoro-2-butene; and
(b) 1,1,1,2,3-pentafluoropropane; wherein the 1,1,1,2,3-pentafluoropropane is present in an effective amount to form an azeotrope-like combination with the Z-1,1,1,4,4,4-hexafluoro-2-butene.

Embodiment D2

A process for preparing a thermoplastic or thermoset foam comprising using an azeotrope-like composition as a blowing agent, wherein said azeotrope-like composition consists essentially of Z-1,1,1,4,4,4-hexafluoro-2-butene and 1,1,1,2,3-pentafluoropropane.

Embodiment D3

A process for producing refrigeration comprising condensing an azeotrope-like composition and thereafter evaporating said azeotrope-like composition in the vicinity of the body to be cooled, wherein said azeotrope-like composition consists essentially of Z-1,1,1,4,4,4-hexafluoro-2-butene and 1,1,1,2,3-pentafluoropropane.

Embodiment D4

A process comprising using an azeotrope-like composition as a solvent, wherein said azeotrope-like composition consists essentially of Z-1,1,1,4,4,4-hexafluoro-2-butene and 1,1,1,2,3-pentafluoropropane.

Embodiment D5

A process for producing an aerosol product comprising using an azeotrope-like composition as a propellant, wherein said azeotrope-like composition consists essentially of Z-1,1,1,4,4,4-hexafluoro-2-butene and 1,1,1,2,3-pentafluoropropane.

Embodiment D6

A process comprising using an azeotrope-like composition as a heat transfer media, wherein said azeotrope-like composition consists essentially of Z-1,1,1,4,4,4-hexafluoro-2-butene and 1,1,1,2,3-pentafluoropropane.

Embodiment D7

A process for extinguishing or suppressing a fire comprising using an azeotrope-like composition as a fire extinguishing or suppression agent, wherein said azeotrope-like composition consists essentially of Z-1,1,1,4,4,4-hexafluoro-2-butene and 1,1,1,2,3-pentafluoropropane.

Embodiment D8

A process comprising using an azeotrope-like composition as dielectrics, wherein said azeotrope-like composition consists essentially of Z-1,1,1,4,4,4-hexafluoro-2-butene and 1,1,1,2,3-pentafluoropropane.

Embodiment E1

A composition consisting essentially of:
(a) Z-1,1,1,4,4,4-hexafluoro-2-butene; and
(b) E-1-chloro-2,3,3,3-tetrafluoropropene; wherein the E-1-chloro-2,3,3,3-tetrafluoropropene is present in an effective amount to form an azeotrope-like combination with the Z-1,1,1,4,4,4-hexafluoro-2-butene.

Embodiment E2

A process for preparing a thermoplastic or thermoset foam comprising using an azeotrope-like composition as a blowing agent, wherein said azeotrope-like composition consists essentially of Z-1,1,1,4,4,4-hexafluoro-2-butene and E-1-chloro-2,3,3,3-tetrafluoropropene.

Embodiment E3

A process for producing refrigeration comprising condensing an azeotrope-like composition and thereafter evaporating said azeotrope-like composition in the vicinity of the body to be cooled, wherein said azeotrope-like composition consists essentially of Z-1,1,1,4,4,4-hexafluoro-2-butene and E-1-chloro-2,3,3,3-tetrafluoropropene.

Embodiment E4

A process comprising using an azeotrope-like composition as a solvent, wherein said azeotrope-like composition consists essentially of Z-1,1,1,4,4,4-hexafluoro-2-butene and E-1-chloro-2,3,3,3-tetrafluoropropene.

Embodiment E5

A process for producing an aerosol product comprising using an azeotrope-like composition as a propellant, wherein said azeotrope-like composition consists essentially of Z-1,1,1,4,4,4-hexafluoro-2-butene and E-1-chloro-2,3,3,3-tetrafluoropropene.

Embodiment E6

A process comprising using an azeotrope-like composition as a heat transfer media, wherein said azeotrope-like composition consists essentially of Z-1,1,1,4,4,4-hexafluoro-2-butene and E-1-chloro-2,3,3,3-tetrafluoropropene.

Embodiment E7

A process for extinguishing or suppressing a fire comprising using an azeotrope-like composition as a fire extinguishing or suppression agent, wherein said azeotrope-like composition consists essentially of Z-1,1,1,4,4,4-hexafluoro-2-butene and E-1-chloro-2,3,3,3-tetrafluoropropene.

Embodiment E8

A process comprising using an azeotrope-like composition as dielectrics, wherein said azeotrope-like composition consists essentially of Z-1,1,1,4,4,4-hexafluoro-2-butene and E-1-chloro-2,3,3,3-tetrafluoropropene.

The invention claimed is:

1. A composition consisting essentially of:
   (a) E-1,1,1,4,4,5,5,5-octafluoro-2-pentene; and
   (b) 1,1,1,2,3-pentafluoropropane; wherein the 1,1,1,2,3-pentafluoropropane is present in an effective amount to form an azeotropic combination with the E-1,1,1,4,4,5,5,5-octafluoro-2-pentene.

2. The composition of claim 1, consisting essentially of from about 3.9 mole % to about 24.1 mole % of E-1,1,1,4,4,5,5,5-octafluoro-2-pentene and from about 75.9 mole % to about 96.1 mole percent 1,1,1,2,3-pentafluoropropane.

3. The composition of claim 1, consisting essentially of from about 3.9 mole % to about 24.1 mole % of E-1,1,1,4,4,5,5,5-octafluoro-2-pentene and from about 75.9 mole % to about 96.1 mole percent 1,1,1,2,3-pentafluoropropane, wherein the vapor pressure is from about 0.59 psia to about 346 psia at a temperature of from about −40° C. to about 140° C.

4. A composition consisting essentially of:
   (a) E-1,1,1,4,4,5,5,5-octafluoro-2-pentene; and
   (b) 1,1,1,2,3-pentafluoropropane; wherein the 1,1,1,2,3-pentafluoropropane is present in an effective amount to form an azeotrope-like combination with the E-1,1,1,4,4,5,5,5-octafluoro-2-pentene.

5. The composition of claim 4, consisting essentially of from about 1 mole % to about 99 mole % of E-1,1,1,4,4,5,5,5-octafluoro-2-pentene and from about 99 mole % to about 1 mole % 1,1,1,2,3-pentafluoropropane.

6. The composition of claim 4, consisting essentially of from about 1 mole % to about 99 mole % of to about 99 mole % of E-1,1,1,4,4,5,5,5-octafluoro-2-pentene and from about 99 mole % to about 1 mole % 1,1,1,2,3-pentafluoropropane, at a temperature of from about −40° C. to about 120° C.

7. A composition consisting essentially of:
   (a) E-1-chloro-2,3,3,3-tetrafluoropropene; and
   (b) 1,1,1,2,3-pentafluoropropane; wherein the 1,1,1,2,3-pentafluoropropane is present in an effective amount to form an azeotropic combination with the E-1-chloro-2,3,3,3-tetrafluoropropene.

8. The composition of claim 7, consisting essentially of from about 65.6 mole % to about 86.7 mole % of E-1-chloro-2,3,3,3-tetrafluoropropene, and from about 13.3 mole % to about 34.4 mole % 1,1,1,2,3-pentafluoropropane.

9. The composition of claim 7, consisting essentially of from about 65.6 mole % to about 86.7 mole % of E-1-chloro-2,3,3,3-tetrafluoropropene, and from about 13.3 mole % to about 34.4 mole % 1,1,1,2,3-pentafluoropropane, wherein the vapor pressure is from about 0.98 psia to about 333 psia at a temperature of from about −40° C. to about 130° C.

10. A composition consisting essentially of:
    (a) E-1-chloro-2,3,3,3-tetrafluoropropene; and
    (b) 1,1,1,2,3-pentafluoropropane; wherein the 1,1,1,2,3-pentafluoropropane is present in an effective amount to form an azeotrope-like combination with the E-1-chloro-2,3,3,3-tetrafluoropropene.

11. The composition of claim 10, consisting essentially of from about 1 mole % to about 99 mole % of E-1-chloro-2,3,3,3-tetrafluoropropene and from about 99 mole % to about 1 mole % of 1,1,1,2,3-pentafluoropropane.

12. The composition of claim 10, consisting essentially of from about 1 mole % to about 99 mole % of E-1-chloro-2,3,3,3-tetrafluoropropene and from about 99 mole % to about 1 mole % of 1,1,1,2,3-pentafluoropropane, at a temperature of from about −40° C. to about 120° C.

13. A composition consisting essentially of:
    (a) Z-1,1,1,4,4,4-hexafluoro-2-butene; and
    (b) E-1-chloro-2,3,3,3-tetrafluoropropene; wherein the E-1-chloro-2,3,3,3-tetrafluoropropene is present in an effective amount to form an azeotrope-like combination with the Z-1,1,1,4,4,4-hexafluoro-2-butene.

14. The composition of claim 13, consisting essentially of from about 1 mole % to about 99 mole % of Z-1,1,1,4,4,4-hexafluoro-2-butene and from about 99 mole % to 1 mole % of E-1-chloro-2,3,3,3-tetrafluoropropene.

15. The composition of claim 13, consisting essentially of from about 1 mole % to about 99 mole % of Z-1,1,1,4,4,4-hexafluoro-2-butene and from about 99 mole % to 1 mole % of E-1-chloro-2,3,3,3-tetrafluoropropene, at a temperature of from about −40° C. to about 140° C.

\* \* \* \* \*